United States Patent
Hellberg et al.

[11] 3,897,543
[45] July 29, 1975

[54] PROCESS FOR MAKING CRYSTALLINE CRYOLITE OF HIGH BULK DENSITY

[75] Inventors: Karl-Heinz Hellberg; Joachim Massonne, both of Hannover, Germany

[73] Assignee: Kali-Chemie Aktiengsellschaft, Hannover, Germany

[22] Filed: May 31, 1973

[21] Appl. No.: 365,766

[30] Foreign Application Priority Data
June 6, 1972   Germany............................ 2227366
Sept. 9, 1972   Germany............................ 2244374

[52] U.S. Cl. ................. 423/465; 423/191; 413/126
[51] Int. Cl.² ........................ C01F 7/54; C01F 7/50
[58] Field of Search..................... 423/465, 126, 191

[56] References Cited
UNITED STATES PATENTS

| | | | |
|---|---|---|---|
| 1,475,156 | 11/1923 | Howard | 423/465 |
| 1,475,157 | 11/1923 | Howard | 423/465 |
| 1,475,158 | 11/1923 | Howard | 423/465 |
| 2,492,650 | 12/1949 | McLean et al. | 423/465 |
| 3,049,405 | 8/1962 | Trupiano et al. | 423/465 |

FOREIGN PATENTS OR APPLICATIONS

| | | | |
|---|---|---|---|
| 1,101,146 | 1/1968 | United Kingdom | 423/465 |

*Primary Examiner*—Edward Stern
*Attorney, Agent, or Firm*—Michael S. Striker

[57] ABSTRACT

Processes for the production of crystalline cryolite having a high bulk density which comprises reacting by slowly adding with continuous stirring to an aqueous solution of hydrofluoric acid containing at least 10 and at most 60% by weight of hydrogen fluoride that is maintained at a temperature between 10° and 80°C, aqueous solutions of aluminum fluoride and sodium chloride or sodium sulfate, the solutions of aluminum fluoride and sodium chloride or sodium sulfate being added simultaneously and in amounts that correspond to an atomic ratio of Al:Na of about 1:3, and the total amounts of the solutions that are thus added being sufficient to react with all of the hydrogen fluoride that is present in the reaction mixture.

16 Claims, 1 Drawing Figure

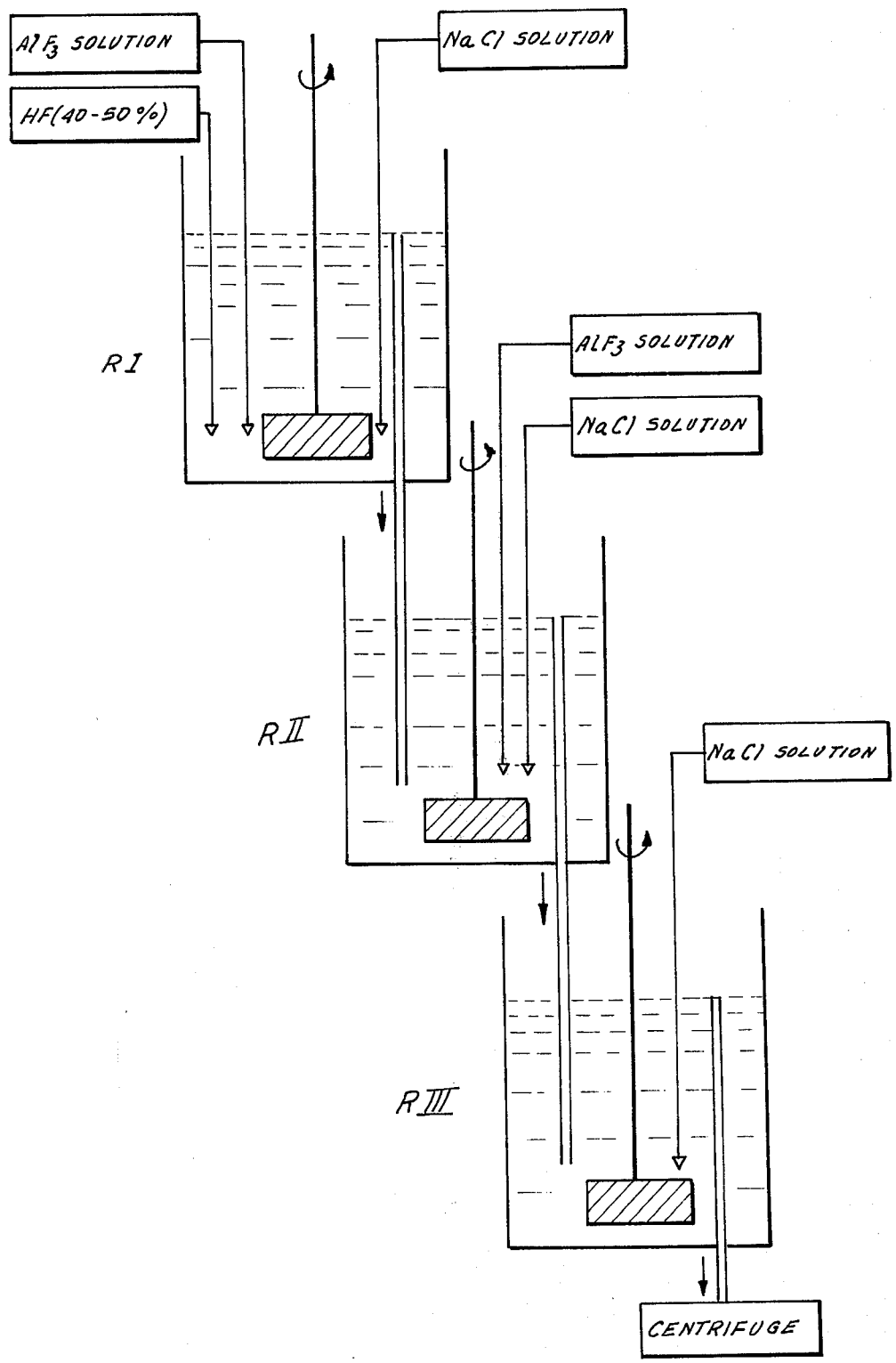

PROCESS FOR MAKING CRYSTALLINE CRYOLITE OF HIGH BULK DENSITY

BACKGROUND OF THE INVENTION

The present invention relates to a process which can be carried out batchwise or in a continuous operation, for making a synthetic cryolite.

Cryolite is a commerical product which is used in large amounts in the aluminum industry. The large scale manufacture is carried out in most cases by batches in a discontinuous operation. A continuous process for making the material is hardly known and hardly used since the cryolite in that case comes out frequently with a large deficiency of NaF relative to the stoichiometric amounts. Such products are undesirable and not useful for the aluminum industry.

As is well known cryolite can be made by reacting an aluminum fluoride solution which has been acidified by hydrogen fluoride with a sodium ions containing solution for instance a sodium chloride solution. This process has various shortcomings. The reaction resulting in cryolite does not have quantitative results in the acid medium. Besides undesirable products are obtained in addition to the cryolite in which the molar ratio NaF : $AlF_3$ is lower than in natural cryolite.

According to the German Pat. No. 1,110,616 it has been tried to form a product similar to natural cryolite. In this process small amounts of a sodium chloride solution were brought into intimate contact with small amounts of fluoaluminic acid for a brief time of contact in a small reactor space. The solution containing the precipitated cryolite is then immediately withdrawn from the small reactor space and maintained in suspension for at least 1 hour while constantly stirring it. Even in this case the cryolite is obtained in a gelatinous consistency of which the purity does not meet the requirements for the aluminum melt electrolysis. The cryolite has thixotropic properties and is comparatively hard to separate by filtration from the mother liquor in which it is formed. The filtration process therefore is rather difficult, time-consuming and requires a large apparatus. Besides, the water contents of the thixotropic products are very high resulting in the necessity to use comparatively high energy for the drying process. This impairs the economics of the process.

According to Swiss Pat. No. 508,554 it has been proposed to make cryolite by reacting in a continuous process in a first stage aluminum hydroxide with an aqueous solution of hydrofluoric acid containing 38% by weight of hydrogen fluoride so as to form an aluminum fluoride solution. This solution is then reacted in a second stage with a mixture of concentrated sodium chloride solution and an aqueous solution of hydrofluoric acid containing 54% by weight of hydrogen fluoride. The precipitated cryolite is filtered continuously via a rotary filter. Thus cryolite is obtained with about 1.45 weight parts NaF per weight part of $AlF_3$. Since however the $AlF_3$ solution and the NaCl/HF mixture are rapidly caused to undergo a precipitation reaction the cryolite formed in this process still has thixotropic properties, a high water content in the wet product from the filtration and a low bulk density. High energies are necessary for the drying process because of the thixotropy.

The present application has the object to provide a process for obtaining a crystalline cryolite of high bulk density in an operation which avoids the shortcomings of the prior art processes.

SUMMARY OF THE INVENTION

A crystalline cryolite of high bulk density is made by placing an aqueous solution of hydrofluoric acid containing at least 10 and at most 60% by weight of hydrogen fluoride in a reactor, then slowly and simultaneously adding an aqueous solution of aluminum fluoride and an aqueous solution of a sodium salt upon vigorous mixing of the components and at an atomic ratio of Al:Na of about 1:3, the total amount of added solution being sufficient to react with all of said hydrogen fluoride and carrying out the reaction at a temperature between 10° and 80°C.

The invention also embraces a continuous process employing several reactors arranged in series, the number of reactors being at least two. The components are employed as above with the qualification that in the first reactor an excess of hydrogen fluoride is employed relative to the amount of fluorine necessary for formation of the cryolite whereupon the product formed in the preliminary reaction in that first reactor is passed into a second reactor including said excess of free hydrogen fluoride. Aluminum fluoride solution and sodium salt solution are then added continuously in said second reactor while the relative atomic ratio of about 1:3 is being maintained between Al and Na and the total amount of added solution is sufficient, together with the hydrogen fluoride, to provide for an atomic ratio of Al:Na:F of about 1:3:6 while the formed cryolite suspension is continuously withdrawn from the second reactor to an extent corresponding to the introduction of fresh components into said two reactors. The withdrawn cryolite suspension is then subjected to a separating process to obtain the cryolite from the mother liquor whereupon the cryolite is subjected to drying.

BRIEF DESCRIPTION OF THE DRAWING

The drawing, in a diagrammitic form, diagrammatic an apparatus for the continuous operation of the process of the invention. Three reactors arranged in cascade manner are employed in this embodiment with inlet ducts as shown.

DETAILS OF THE INVENTION AND PREFERRED EMBODIMENTS

Preferably the sodium salt solution is a sodium chloride or sodium sulfate solution or a mixture of these two solutions.

The cryolite formation in the present process is effected in a highly acidic medium at a pH between 0 and 1. The thus obtained cryolite is very close in its physical and chemical properties to natural cryolite. It could not be expected and is surprising that in a highly acid medium an almost stoichiometric cryolite can be made.

It is important that in the batch process of the invention that the hydrogen fluoride be first placed in the reactor and that the aluminum fluoride solution and sodium salt solution such as sodium chloride or sodium sulfate solution be simultaneously introduced. A vigorous mixing is necessary for all components. Any other type of bringing the three components together leads to unsatisfactory results.

The hydrogen fluoride preferably is supplied in the form of an aqueous solution of hydrofluoric acid containing 15 to 40% by weight of hydrogen. The concentration of the aluminum fluoride solution and sodium salt solution can be selected as desired. However, the addition of the aluminum fluoride solution and of the sodium salt solution must be effected in a manner to maintain an atomic ratio of Al:Na = 1:3.

The reaction can be carried out at a temperature between 10° and 80°C and preferably the temperature is between 20° and 50°C. The introduction of the solutions into the aqueous solution of hydrogen fluoride should not be made too rapidly. The introduction may require a period from 10 to 100 minutes. Generally a period between 15 and 45 minutes is sufficient.

An improvement of the yield can be obtained by adding the aqueous sodium salt solution at an excess of 5 to 50%, preferably from 10 to 20% relative to the stoichiometric amount. The excess sodium salt solution can be added subsequently. The cryolite yield with this product relative to the employed hydrogen fluoride is between 92.5 and 95%.

The forming of a perfect mixture during the simultaneous introduction of aluminum fluoride solution and sodium salt solution into the hydrogen fluoride is quite important. As the examples below will show the bulk density of the cryolite increases with an increase of the stirring speed. If favorable reaction conditions and a vigorous mixing of the media is maintained bulk densities of the cryolite can be accomplished which are very close or equivalent to the bulk densities of ground natural cryolite. The crystallization can further be aided by adding, to the aqueous solution of hydrogen fluoride, seen crystals in the form of dried crystalline cryolite or in the form of a cryolite suspension prior to the reaction.

The three conspicuous advantages of the process of the invention are that because of the high crystallinity of the cryolite the filtration operation can be shortened to between one-tenth and one-twentieth of the filtration time necessary in the prior art. Furthermore because of the lack of thixotropic properties of the cryolite the water content of the wet filter product will be only between one-third and one-fourth of the conventional values. Finally the bulk weight of the product which has been dried at 120°C will be between 900 and 1,300 g/l depending on the conditions of the reaction.

Cryolite produced in accordance with prior processes, as stated hereinbefore, was difficult to separate by filtration from the mother liquor in which it was formed, and the resulting filter cake had a high content of water and after drying had a bulk density of only 450 to 600 g/l.

The cryolite which is formed by the process of the invention and dried at 120°C, moreover has a degree of purity beteen 98.5 and 99.5%. The water content of the cryolite normally is only 0.5 to 1.2%. The analysis of Na, Al and F shows almost theoretical values. The NaF:AlF$_3$ mol ratio is between 2.95:1 and 3:1.

In a preferred embodiment of the invention the cryolite formation is carried out as described and the supernatant liquid which remains after settling of the crystals is removed by siphoning it off whereupon fresh hydrogen fluoride is added and is again reacted by simultaneous addition of aluminum fluoride solution and sodium salt solution. The siphoning off of the solution does not involve any difficulties and can be done without loss of cryolite since the formed cryolite has a high degree of crystallinity and settles therefore rapidly and quantitatively at the bottom of the reaction vessel. This process eventually permits to obtain a colorless crystalline cryolite at a high yield which is characterized by a high bulk density after drying.

The present process can also be carried out in a continuous operation. In a simple embodiment this can be done with two reactors. With reference to the drawings it is only necessary that hydrogen fluoride is placed in the reactor RI and that the reaction is carried out in a manner to permit a mixture to pass into reactor RII in which free hydrogen fluoride is present. This mixture is then converted in the second reactor by simultaneous introduction of aluminum fluoride solution in aqueous sodium salt solution while an atomic ratio of Al:Na of 1:3 is preserved.

Instead of the reactor RII it is also possible to use several reactors which can for instance be arranged in a cascade like series. The simultaneous addition of aluminum fluoride solution and sodium salt solution to the hydrogen fluoride can then be carried out in stages. This is particularly advantageous if the reaction is directed in a manner to provide for a large amount of free hydrogen fluoride in the mixture passing out of the reactor RI.

The presence of free hydrogen fluoride in this mixture can be obtained by introducing into the initially present hydrogen fluoride together with the aluminum fluoride solution and the sodium salt solution additional hydrogen fluoride to obtain an excess of hydrogen fluoride beyond the stoichiometric amount.

The process of the invention in which the making of the crystalline cryolite of high bulk density is effected in continuous operation is characterized by reacting while vigorously mixing, in at least two reactors arranged in series and at a temperature between 10° and 80°, the various components as follows:

a. In reactor RI an aqueous solution of hydrofluoric acid containing at least 10 and at most 60% by weight of hydrogen fluoride is placed.

b. Subsequently concentrated aqueous aluminum fluoride solution, sodium salt solution and hydrogen fluoride are continuously and simultaneously introduced in reactor RI and reacted while the introduction of the individual components is adjusted to provide for an atomic ratio of Al:Na = 1:3 in the mixture and to provide for an excess of hydrogen fluoride beyond the stoichiometric amount of fluorine necessary for forming the cryolite;

c. The product which has thus been formed in the preliminary reaction is then continuously passed into reactor RII where an aluminum fluoride solution and sodium salt solution is continuously added while maintaining an atomic ratio of Al:Na = 1:3. The total amount of added solution must be such that together with the excess of hydrogen fluoride the atomic ratio is Al:Na:F = 1:3:6;

d. The formed cryolite suspension is then withdrawn from reactor RII in the same amounts as fresh components are added and e. the cryolite formed is separated from the mother liquor in a continuous operation and subjected to drying.

It is preferred to have a 100% excess of hydrogen fluoride in the reactor RI relative to the fluorine amount necessary to make cryolite. The process however can also be carried out with a larger or smaller excess of hydrogen fluoride. The lower limit is about 10% excess of HF.

A conditioning and increase of the yield can be attained by employing the sodium salt solution at an excess of 5 to 50 weight percent relative to the amount necessary for making cryolite in the last reactor. In general good results are obtained with weight percent excesses of 10 to 20%.

According to a preferred embodiment the excess amount of sodium salt solution is continuously added in a separate reaction vessel. In all reaction vessels the reaction requires vigorous mixing of the components.

The cryolite yield relative to the initial amount of hydrogen fluoride is between 92.5 and 95% in this continuous operation.

As sodium salt solution there may be used saturated sodium chloride or sodium sulfate solutions. The aluminum fluoride solutions are preferably used in the form of supersaturated solutions. As the source of hydrogen fluoride aqueous solutions of hydrofluoric acid may be used which have a concentration between 10 and 60%, particularly between 40 and 50% by weight of hydrogen fluoride.

The addition of the solutions should not be effected too rapidly. The throughput of the solutions based on the volume of the reactor can be effected in a period between 10 and 100 minutes. Usually a period between 15 and 45 minutes is adequate. The temperature preferably will adjust to between 30° and 50°C.

The continuous process has the advantage as against the batchwise proceeding that the cryolite obtained is further improved in regard to its physical properties. The highly crystalline product after centrifuging has a water content of 4 to 6%. After drying at 120°C its bulk density is between 1,200 and 1,600 g/l depending on the reaction conditions. The degree of purity of the product is 98 to 99%. The water content of the final product is between 1.0 and 1.5%. The NaF:AlF$_3$ molar ratio is between 2.9:1 and 3.0:1. The following examples will further illustrate the invention. They will also show that certain deviations from the invention lead to a loss of optimum properties of the formed cryolite.

EXAMPLE 1

150 g of an aqueous solution of hydrofluoric acid containing 40% by weight of hydrogen fluoride were placed together with 270 ml water into a polypropylene vessel and the mass was then heated to 30°C. Subsequently 740 ml of an AlF$_3$ solution containing 84 g AlF$_3$ and 600 ml of a NaCl solution containing 201 g NaCl (15% excess relative to the stoichiometric amount) were introduced into the vessel within a period of 60 minutes in a manner such that the Na:Al atomic ratio of the added solutions was 3.45:1. The mass was vigorously mixed by means of a propeller stirrer operating at a stirring speed of 200 rpm.

After addition of the solutions filtration was applied by a suction filter (diameter 11 cm) operating with a water jet vacuum pump and washing followed with 400 ml water. The total time necessary for the filtration and water wash was 4 minutes.

The product was then filtered for an additional 5 minutes with a water jet vacuum pump and subsequently dried at 120°C until its weight became constant. The wet cryolite crystal that were thus obtained before drying were immaculately white, crystalline and contained 16.1% by weight of water. The cryolite yield after drying was 92.5% relative to the initially used HF. The dried cryolite was crystalline and had a purity of 99% and a bulk density of 860 g/l.

COMPARATIVE EXAMPLE A 150 g of an aqueous solution of hydrofluoric acid containing by weight of hydrogen fluoride in 270 ml water and 600 ml NaCl solution containing 201 g NaCl (15% excess relative to the theoretical value) were placed into a polypropylene vessel. 740 ml of an AlF$_3$ solution containing 1 mol AlF$_3$ were then added within 30 minutes at 30°C under stirring with a propeller stirrer operating at 200 rpm. The stirring was continued for 1 hour. Subsequently the mass was subjected to filtration, washing with 400 ml water and drying at 120°C.

For the filtration and washing 55 minutes were necessary. The filter-wet cryolite (that is, the wet filter cake) was thixotropic and had a water content of 44.8%. After drying a pulverulent cryolite was obtained in a 90.2% yield and 95.5% purity. Its bulk density was 495 g/l.

COMPARATIVE EXAMPLE B 750 ml of an AlF$_3$ solution containing 1 mol AlF$_3$ and 150 g of an aqueous solution of hydrofluoric acid containing 40% by weight of hydrogen flluoride were mixed together to form fluoaluminic acid (H$_3$AlF$_6$) and the mixture was placed in a 2 liter polypropylene vessel. 620 ml NaCl solution containing 201 g NaCl (15% excess) were then added within 15 minutes at 30°C to the fluoaluminic acid while it was stirred with a propeller stirrer at 200 rpm. The stirring was continued for 1 hour followed by filtration, washing with water and drying at 120°C.

The filtration and water took 19 minutes. The filter-wet cryolite having a water content of 41.4%. The yield was 90% relative to the initially used HF. After drying at 120°C a cryolite was obtained of 94.5% purity and a bulk density of 570 g/l.

EXAMPLE 2

150 g of an aqueous solution of hydrofluoric acid containing 40% by weight of hydrogen fluoride and 270 ml water were placed into polypropylene vessel and heated to 30°C. Subsequently 780 ml of AlF$_3$ solution containing 84 g AlF$_3$ and 783 ml NaCl solution containing 263 g NaCl (50% excess relative to the stoichiometric amount) were added within 60 minutes in a manner such that the Na:Al atomic ratio of the added solutions was 3:1. The excess NaCl solution was subsequently added within 30 minutes. The mass was then subjected to further stirring for another 30 minutes with a high speed stirrer rotating at a speed of 400 rpm.

The reaction mixture was filtered as in Example 1, washed and dried at 120°C. For the filtration and the water wash 3 minutes were necessary. The filter-wet product was crystalline and contained 12.1% water. After drying the cryolite was obtained in a 94.3% yield relative to the initially used HF. It was crystalline, had a purity of 99% and a bulk density of 1100 g/l.

EXAMPLE 3

150 g of an aqueous solution of hydrofluoric acid containing 40% by weight of hydrogen fluoride diluted with 270 ml water were reacted in the same manner as in Example 1 with 750 ml AlF$_3$ solution containing 1 mol AlF₃ and 572 ml NaCl solution containing 184 g NaCl (5% excess relative to the stoichiometric amount). The introduction of the AlF₃ and NaCl solutions was effected during a period of 30 minutes and the Na:Al atomic ratio was 3:1. The excess NaCl solution was then added in another 10 minutes. Subsequently stirring was continued for 15 minutes with a propeller stirrer at 200 rpm. The stirring was then discontinued.

After 5 to 10 minutes the crystalline cryolite had settled quantitatively at the bottom of the reaction vessel. About three-fourths of the reaction solution was then siphoned off and 150 g of an aqueous solution of hydrofluoric acid containing 40% hydrogen fluoride was added to the residual mixture which was still in the reaction vessel.

Thereafter 750 ml of an AlF₃ solution containing 1 mol AlF₃ and 627 ml NaCl solution containing 201 g NaCl (15% excess) were added while stirring within a period of 30 minutes. The Na:Al atomic ratio of the added solutions was exactly 3:1. The excess NaCl was subsequently added within 15 minutes. The reaction took place at 30°C while the stirring was continued at 200 rpm. After adding all of the solutions stirring was continued for 15 minutes followed by filtration, washing and drying at 120°C. The filtration and water wash took a total of 3 minutes.

The filter-wet cryolite was crystalline and contained 9.6% water. The cryolite after drying was obtained in a yield of 94% relative to the initially used HF. The dried cryolite was crystalline, had a purity of 99.1% and a bulk density of 1130 g/l.

EXAMPLE 4

The process of making the cryolite in this case is the same as in Example 3. However, the initially used hydrogen fluoride was not heated to 30°C but had after dilution with water a temperature of 25°C. During the reaction the temperature rose to 33°C.

The formed cryolite had the same properties as in Example 3. Filtration and water wash took altogether 4 minutes. The water content of the filter-wet product was 10.1%. It had a yield of dried cryolite of 92.5% relative to the initially used HF. The purity was 98.9% and its bulk density was 1,095 g/l.

EXAMPLE 5

The process of making the cryolite in this example is again the same as in Example 3. However, the initially aqueous solution of hydrofluoric acid containing 40% by weight of hydrogen fluoride was not diluted with water. In this case the cryolite was obtained in a yield of 94.5% relative to the initially used HF and at a 99.5% purity. The filtration and water wash took altogether 3 minutes. The water content of the filter-wet product was 12.7% and its bulk density was 950 g/l.

EXAMPLES 6 to 9

The process of making the cryolite in this case was the same as in Example 3. Instead of the propeller stirrer a high-speed stirrer was used. The reaction was carried out at stirring speeds of 100 rpm, 200 rpm, 300 rpm and 400 rmp. The results obtained appear from the following Table:

| No. | Stirring speed (rpm) | Cryolite yield (%) | Water content of filter-wet product (%) | Bulk Density (g/l) | Time for filtration and water wash (min) | purity (%) content of cryolite |
|---|---|---|---|---|---|---|
| 6 | 100 | 92.6 | 26.5 | 560 | 3 | 99.0 |
| 7 | 200 | 93.2 | 15.5 | 830 | 3 | 99.4 |
| 8 | 300 | 92.8 | 12.7 | 990 | 3 | 99.5 |
| 9 | 400 | 93.5 | 9.8 | 1150 | 3 | 99.3 |

EXAMPLE 10

150 g of an aqueous solution of hydrofluoric acid containing 40% by weight of hydrogen fluoride were placed in a vessel of polypropylene. Subsequently 690 ml of an AlF₃ solution containing 84 g AlF₃ and 614 ml of an NaCl solution containing 201 g NaCl (15% excess relative to the stoichiometric amount) were added within a period of 33 minutes. The reaction temperature was set for 30°C. The mixing was effected with a propeller stirrer at 200 rpm. The further processing was the same as in Example 1.

The water content of the filter-wet cryolite was 14.4% by weight. After drying the cryolite yield was 94.5% relative to the initially used HF. The cryolite was of a fine crystal form, had a purity of 99.5% and a bulk density of 900 g/l.

COMPARATIVE EXAMPLE C

Example 10 was modified as follows: The hydrogen fluoride was reacted with the NaCl solution and subsequently the AlF₃ solution was added within 33 minutes. The reaction temperature was set for 30°C. After a reaction period of 1 hour following the addition filtration was effected followed by a water wash with 400 ml water and drying at 120°C. The filter-wet cryolite was thixotropic and contained 40.8% water. The filtration and water wash required 35 minutes.

After drying a pulverulent cryolite was obtained in a yield of 92.8%. The cryolite had a purity of 96.3% and its bulk weight was 535 g/l.

EXAMPLE 11

150 g of an aqueous solution of hydrofluoric acid containing 40% by weight of hydrogen fluoride was diluted with 270 ml water and placed in a vessel of polypropylene. Subsequently 750 ml of an AlF₃ solution containing 84 g AlF₃ and 740 ml Na₂SO₄ solution containing 223 g Na₂SO₄ (5% excess relative to the stoichiometric amount) were added within 30 minutes at a reaction temperature of 30°C. The Na:Al atomic ratio of the added solutions was maintained at a value of 3:1. The excess Na₂SO₄ solution was added within another 15 minutes and stirring was continued for another 15 minutes. The stirrer was a propeller (vane) stirrer which operated at a stirring speed of 200 rpm.

After completion of the reaction the stirring was discontinued. The cryolite then settled rapidly and quantitatively at the bottom of the reaction chamber. Three-fourths of the reaction solution were then removed by siphoning. 150 g of an aqueous solution of hydrofluoric acid containing 40% by weight of hydrogen fluoride were then again added to the solution remaining in the reactor. The solution was then reacted with 750 ml $AlF_3$ solution containing 1 mol $AlF_3$ and 790 ml $Na_2SO_4$ solution containing 244 g $Na_2SO_4$ (15% excess relative to the stoichiometric amount) under the same reaction conditions as maintained above. After all of the solutions had been added stirring was continued for another 15 minutes followed by filtration, washing and drying at 120°C.

The filtration and water wash took a total of 3 minutes. The filtration was effected as stated in Example 1. The filter-wet product was of a crystalline form and contained 8.4% water. After drying the cryolite was obtained at a yield of 95.1% relative to the initially used HF. The cryolite was of crystalline form, had a purity of 99.5% and a bulk density of 1275 g/l.

EXAMPLE 12

This Example illustrates an embodiment for carrying out the process in a continuous operation with three reactors arranged in the form of a cascade. Reference is made to the attached drawing regarding this embodiment.

As appears from the drawing the apparatus consists of three reactors RI, RII and RIII connected by overflows and equipped with stirrers. Reactor RI additionally has inlets for hydrogen fluoride, an aluminum fluoride solution and a sodium chloride solution. Inlets are provided also for reactors RII and RIII, in case of reactor RII the inlets are intended for $AlF_3$ and NaCl solutions while the single inlet for reactor RIII is for NaCl solution only. The overflow from the reactor RIII leads to a centrifuge.

At the beginning of the reaction 300 g of an aqueous solution of hydrofluoric acid containing 20% by weight of RI and reacted at a temperature of 30°C within 30 minutes with 750 ml of an aqueous aluminum fluoride solution (1 mol $AlF_3$), 575 ml sodium chloride solution containing 175.5 g NaCl (3 mol NaCl) and 150 g of an aqueous solution of hydrofluoric acid 40% by weight of hydrogen fluoride (3 mol HF). The mass was subjected to vigorous mixing with a high-speed stirrer. The atomic ratio of the mass was Al:Na = 1:3. HF was present in an excess of 100% relative to the amount necessary for cryolite formation.

For the continuous operation there were subsequently added to this solution each hour and simultaneously 1500 ml aqueous aluminum fluoride solution (2 mol $AlF_3$), 600 g of a 40% by weight hydrogen fluoride (12 mol HF) and 1146 ml sodium chloride solution containing 351 g NaCl (6 molecular NaCl). The molecular ratio accordingly was as follows: $AlF_3$:HF:NaCl = 1:6:3. In the formed reaction mixture the atomic ratio was Al:Na = 1:3. Hydrogen fluoride was present in an excess of 100% relative to the amount necessary for the cryolite formation.

Upon commencement of the continuous addition of the solutions the mixture was passed from the reactor vessel RI to the reactor vessel RII to the same extent as fresh reaction components were added. Simultaneously 1,500 ml aluminum fluoride solution and 1,146 ml sodium chloride solution were continuously added in reactor vessel RII. Those solutions had the same concentrations as in reactor vessel I. These amounts were the amounts added per hour. The molecular ratio in the solution was therefore $AlF_3$:HF:NaCl = 1:3:3. In the final product the atomic ratio was Al:Na:F = 1:3:6.

After the reaction vessel RII had been filled the mass was passed from reaction vessel RII into reaction vessel RIII to the same extent as fresh reaction components were introduced into the reaction vessel RII. As soon as the aqueous cryolite suspension had been passed into the reaction vessel RIII 340 ml sodium chloride solution per hour were added continuously into the latter reaction vessel. There was therefore present then an NaCl excess of 15 mol percent relative to the amount necessary for the cryolite formation.

The cryolite suspension was continuously withdrawn from the reactor vessel RIII and subsequently filtered and dried at 120°C.

In this continuous operation temperatures were obtained in the reactor vessels between 30° and 40°C. The hourly output of cryolite was 790 g. The conversion relative to the initially used hydrogen fluoride was 94%.

The cryolite was of a clean white and crystalline form. After drying at 120°C it had a bulk density of 1285 g/l and a purity of 98%.

Without further analysis, the foregoing will so fully reveal the gist of the present invention that others can be applying current kknowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A process for the production of crystalline cryolite particles having a bulk density between approximately 900 and 1,300 grams per liter which comprises reacting by slowly adding with continuous stirring to an aqueous solution of hydrofluoric acid containing at least 10 and at most 60% by weight of hydrogen fluoride, aqueous solutions of aluminum fluoride and a sodium salt of the group consisting of sodium chloride and sodium sulfate, while the temperature of the mixture is maintained between 10° and 80°C and its hydrogen-ion concentration at a value corresponding to a pH between 0 and 1.0, the solutions of aluminum fluoride and sodium salt being added simultaneously in amounts that correspond to an atomic ratio of Al:Na of about 1:3, and the total amounts of the solutions that are thus added being sufficient to react with all of the hydrogen fluoride that is present in the reaction mixture.

2. A process as defined in claim 1 in which the aqueous solution of hydrofluoric acid contains at least 15 and at most 40% by weight of hydrogen fluoride.

3. A process as defined in claim 1 in which the aqueous solution of hydrofluoric acid also contains seed crystals of cryolite.

4. A process as defined in claim 1 in which the aqueous solution of the sodium salt is added in an amount that is between 5 and 50% in excess of that required stoichiometrically to produce cryolite.

5. A process as defined in claim 4 in which the aqueous solution of the sodium salt is added in an amount that is between 10 and 20% in excess of that required stoichiometrically to produce cryolite.

6. A process for the continuous production of crystalline cryolite particles having a bulk density between approximately 900 and 1,300 grams per liter which comprises reacting by a. continuously adding with continuous agitation to the first of at least two reactors arranged in series containing initially an aqueous solution of hydrofluoric acid containing at least 10 and at most 60% by weight of hydrogen fluoride, such amounts of aqueous solutions of hydrofluoric acid, aluminum fluoride, and a sodium salt of the group consisting of sodium chloride and sodium sulfate that the atomic ratio of Al:Na in the mixture is approximately 1:3 and the hydrogen fluoride is always present in an amount in excess of that required stoichiometrically to form $Na_3AlF_6$, b. continuously withdrawing a stream of the mixture from the first reactor and passing it to a second reactor in the series, c. continuously adding to the mixture in the second reactor that was withdrawn from the first reactor such amounts of the aqueous solutions of aluminum fluoride and the sodium salt that the atomic ratio of Al:Na:F is about 1:3:6, while d. continuously withdrawing from the second reactor a stream of the mixture therein, and e. subsequently recovering from the mixture withdrawn from the second reactor the crystalline cryolite particles that are suspended therein, f. while the temperature of the mixture in the first and second reactors is maintained between 10° and 80°C and the hydrogen-ion concentration at a value corresponding to a pH between 0 and 1.0.

7. The process of claim 1 wherein the reaction is carried out at a temperature between 20° and 50°C.

8. The process of claim 6 wherein the several reactors are arranged in form of a cascade.

9. The process of claim 6 wherein the reaction is effected at a temperature between 20° and 50°C.

10. A process as defined in claim 6 in which the steps specified therein are conducted in more than two reactors.

11. A process as defined in claim 6 in which the amount of hydrogen fluoride that is maintained in the mixture in the first reactor is about 100% more than is required stoichiometrically to produce cryolite.

12. A process as defined in claim 6 in which the amount of the solution of the sodium salt that is added to a subsequent reactor in the series is between 5 and 50% more than is required stoichiometrically to produce cryolite.

13. A process as defined in claim 12 in which the amount of the solution of the sodium salt that is added to a subsequent reactor in the series is between 10 and 20% more than is required stoichiometrically to produce cryolite.

14. A process as defined in claim 6 which includes an additional step in which a stream of the mixture from the second reactor is continuously withdrawn and passed into a third reactor in which an aqueous solution of the sodium salt is continuously added to the mixture so that the amount of sodium salt that is present in the mixture is in excess of that required stoichiometrically to produce cryolite.

15. A process as defined in claim 6 in which the aqueous solution of the sodium salt is a saturated solution.

16. A process as defined in claim 6 in which the aqueous solution of aluminum fluoride is a supersaturated solution.

* * * * *